United States Patent

Skarbo

[15] 3,653,815

[45] Apr. 4, 1972

[54] RECOVERY OF MOLYBDENUM
[72] Inventor: Roald R. Skarbo, Lexington, Mass.
[73] Assignee: Kennicott Copper Corporation, New York, N.Y.
[22] Filed: Sept. 3, 1969
[21] Appl. No.: 855,006

[52] U.S. Cl. .................................. 23/15 W, 23/18, 23/51, 23/140
[51] Int. Cl. ............................................. C22b 59/00
[58] Field of Search .................. 23/15, 15 W, 18, 51, 140; 75/121, 84

[56] References Cited

UNITED STATES PATENTS

| | | | |
|---|---|---|---|
| 1,895,811 | 1/1933 | Morgan | 23/15 W |
| 2,017,557 | 10/1935 | Winkler et al. | 23/15 W |
| 2,096,846 | 10/1937 | Donahue et al. | 23/15 W |
| 2,238,250 | 4/1941 | Curtis | 23/15 W |
| 3,196,004 | 7/1965 | Kunda | 23/15 W |
| 3,351,423 | 11/1967 | Zimmerley et al. | 23/140 X |
| 3,376,104 | 4/1968 | Messner et al. | 23/15 W |
| 3,455,677 | 7/1969 | Litz | 23/15 W |

*Primary Examiner*—Herbert T. Carter
*Attorney*—John L. Sniado and Lowell H. McCarter

[57] ABSTRACT

The specification describes a method of recovering molybdenum from molybdenum containing ore wherein the ore is subjected to the conventional process steps of concentrating, roasting, and ammonia leaching followed by novel procedures to remove the copper from the leach solution without the necessity of adding an agent to precipitate the contaminant copper. The copper contaminate in the leach solution is precipitated out of the solution by (1) partial evaporation of the leach solution followed by dilution back to about its original volume, and (2) stream stripping of the leach solution until precipitation of the copper complex is complete.

7 Claims, 2 Drawing Figures

REMOVAL OF COPPER FROM AMMONIACAL SOLUTION CONTAINING MOLYBDENUM

INVENTOR
Roald R. Skarbö

RECOVERY OF METAL VALVES FROM PRECIPITATES

RECOVERY OF MOLYBDENUM

BACKGROUND

The field of the invention relates to the hydrometallurgical processing of ores to recover the metallic values therefrom. More specifically it relates to the precipitation of a metal contaminant in a leach solution obtained by ammonia leaching of molybdenum concentrates. The invention also relates to a method of removing copper from an ammoniacal solution that contains copper and molybdenum without the necessity of adding a precipitating agent.

The problem of recovering molybdenite from copper bearing ores has long been a problem to the producers of molybdenum. Molybdenite from which the molybdenum is obtained commonly occurs in copper bearing ores. When such ores are beneficiated by conventional froth flotation processes using flotation reagents, such as xanthates and dithiophosphates, the molybdenite floats with the copper sulphide minerals. Since copper is the prime value in such ores, flotation plants are operated to produce optimum copper recovery without particular regard for the molybdenum recovery. Recovery of the molybdenum value of the ore has therefore been restricted to processes of separating the molybdenum from the molybdenum containing cleaned copper concentrates obtained by flotation processes employing conventional flotation reagents. These processes have proved to be costly and tedious without obtaining the most economical separation of the copper and molybdenum minerals.

As is well known, the molybdenum containing cleaned copper concentrates employed as starting material in the current processes contained from about 60 percent to no more than 80 percent of the original molybdenum content of the ore, the remainder of the molybdenite having been lost in the operations involved in producing the concentrates. Accordingly, the eventual recovery of molybdenum by any subsequent processes must be very efficient in order to obtain a reasonable recovery of molybdenum based on the molybdenum concentration of the starting ore.

While the prime value of these ores is for copper recovery, the recovery of the molybdenum values as a high-grade product is highly desirable from an economic standpoint. The art is, therefore, constantly seeking methods to improve the efficiency and/or lower the cost of molybdenum recovery from the ore without at the same time adversely effecting the copper recovery.

In recent years there have been a number of processes for recovering molybdenum from molybdenite concentrates. The most pertinent prior art as far as I am aware is U.S. Pat. No. 3,196,004 issued to V. Kunda on July 20, 1965. The Kunda patent discloses that molybdenite is converted to $MoO_3$ by any of the conventional roasting methods; the $MoO_3$ is then leached from the calcine with an ammoniacal ammonium sulphate solution at ambient temperatures; and the solution is purified, if required, to remove copper and other metal impurities. The molybdenum is precipitated in the presence of a catalyst, at elevated temperature with a reducing gas such as hydrogen, as a lower oxide of molybdenum containing about 60 percent Mo. This lower molybdenum oxide is then reduced with hydrogen at about 1,800° F. to produce pure molybdenum powder.

SUMMARY

In general terms the invention disclosed herein relates to the preparation of molybdenum trioxide by a process that includes the conventional steps of roasting the molybdenum containing concentrates, leaching the calcined concentrates with an ammonium hydroxide solution to remove the metal values therefrom and removing the insoluble residues from the leach solution. The novel feature of this invention resides in causing the copper contaminate in the leach solution to precipitate out of the leach solution without the necessity of adding a precipitating agent or a catalyst to cause such a precipitation. The precipitate is a copper-molybdenum complex from which the copper and molybdenum may be recovered by methods hereinafter described. The copper may be precipitated from the leach solution in any of three separate methods as will be further described hereinafter. After removal of the copper contaminant the leach solution is completely evaporated to form a molybdenum containing compound. The molybdenum containing compound is then dried and calcined to produce the desired molybdenum trioxide.

DRAWINGS

DESCRIPTION

Figure 1:
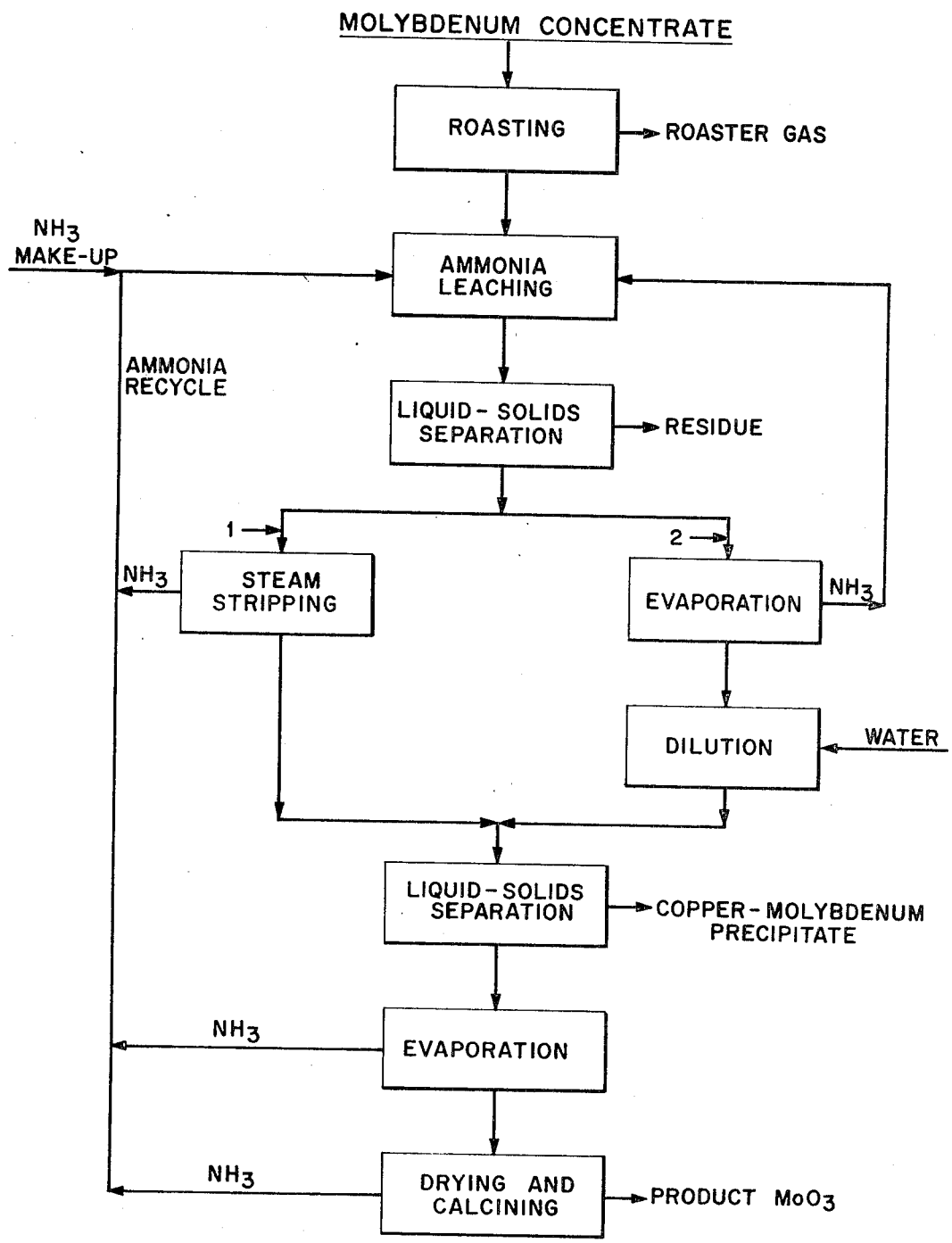
FIG. 1 is a flow sheet which illustrates the preferred embodiments of this invention.

In the concentration of copper-molybdenum sulphide ores, the first product is a mixed copper-molybdenum concentrate. Different methods are then used to separate the molybdenum from copper. Separation may be accomplished by flotation of the molybdenite while the copper sulphide is depressed by sodium sulphite or sodium or potassium cyanide. The separation may also be accomplished by the flotation of the copper sulphide while the molybdenite is depressed by starch. Processes typical of those currently used for recovery of molybdenite from copper-bearing ores are discussed in U.S. Pat. No. 3,351,193.

The molybdenite concentrates are usually classified into "high-grade" and "low-grade" concentrates. These concentrates will contain from about 25 percent molybdenum up to 65 percent or more molybdenum. The molybdenum concentrates will also contain quantities of iron, copper, sulphur, zinc and insoluble gangue materials.

The process of this invention permits the treatment of high or low grade concentrates with a high copper content with the same facility as those low in copper, thus eliminating expensive and time consuming multiple flotation steps required to produce a concentrate suitable for processing by known methods. However it will be recognized by those skilled in the art from the following description that the process of this invention is particularly economically advantageous when applied to concentrates with a low copper content, i.e., less than about 2.0 percent.

The starting material, i.e., the high or low grade concentrate, is treated to convert the molybdenum to molybdenum trioxide. Preferably, the concentrate is subjected to an oxidizing roast. The sulfur contained in the concentrate is driven off as sulfur dioxide. The molybdenite is rapidly oxidized by atmospheric oxygen in an exothermic reaction.

$$MoS_2 + 3.5O_2 \rightarrow MoO_3 + 2SO_2 + 266 \text{ kcal} \quad (1)$$

The roasting of the concentrates at 550°–600° C. also causes the oxidation of iron, copper and zinc sulphides which yields oxides (and partly sulfates) by the following reactions:

$$MeS + 1.5O_2 \rightarrow MeO + SO_2; \quad (2)$$
$$2SO_2 + O_2 \leftrightarrows 2SO_3; \quad (3)$$
$$MeO + SO_3 \leftrightarrows MeSO_4 \quad (4)$$

where Me is iron, copper, nickel, zinc or other metal contaminants.

The roast can be conducted in conventional roasting equipment such as for example a multiple-hearth furnace or a rotary kiln. The roasting temperature in the hearth should not exceed 600° C.; temperatures as high as 750° to 800° C. must be avoided since molybdenum trioxide melts at such temperatures with consequent clogging of the openings and rapid wear of the paddles in the furnace. It is also contemplated that the roasting may be accomplished in a fluidized bed where the temperatures are closely controlled. Fluidized bed roasting is of a particular advantage because the flow rates of the concentrates and oxidizing gases can be controlled to minimize the contact between the particles and this eliminate as far as possible the formation of molybdates.

The rate of oxidation is dependent on the oxygen flow rate as well as the temperature and, therefore, it is desirable to maintain an excess of air flowing through the roasting kiln. The roasting is continued until all of the molybdenite is converted to molybdenum trioxide.

The leaching step can be carried out in an open or closed vessel at ambient temperatures or at elevated temperatures below the boiling point of the leaching solution. The leaching solution is an aqueous ammoniacal solution and should contain at least two moles of ammonia per mole of molybdenum. Preferably the $NH_3/Mo$ molar ratio is maintained in the range of 2.5 to 3. Higher ratios do not significantly improve the amount of molybdenum recovered from the calcine and tend to inhibit the removal of the contaminant copper.

When the ammoniacal solution reacts with the molybdenum trioxide in the calcine the reaction may be depicted as:

$$MoO_3 + 2NH_4OH \rightarrow (NH_4)_2MoO_4 + H_2O \quad (5)$$

The degree of extraction of the molybdenum depends on the condition of the calcine. In addition to the molybdenum trioxide the calcine may contain calcium, copper, zinc, and ferrous molybdate, molybdenum dioxide, nonoxidized molybdenite, copper and calcium sulphate, iron oxide, silica, alkali metal salts, tungsten materials and other impurities. Calcium molybdate, molybdenum dioxide, and molybdenite are virtually insoluble in ammonia solutions. The molybdenum in these compounds remain behind in the leaching tailings. The copper, zinc, and nickel molybdate and sulphates are readily soluble in ammonia solutions yielding ammoniates.

$$MeMoO_4 + 4NH_4OH \rightarrow [Me(NH_3)_4]MoO_4 + 4H_2O \quad (6)$$
$$MeSO_4 + 4NH_4OH \rightarrow [Me(NH_3)_4]SO_4 + 4H_2O \quad (7)$$

where Me is copper, zinc, nickel or other soluble metal contaminant.

Ferromolybdate is decomposed by ammonia solutions, but the reaction is slow because of formation of virtually insoluble ferric and ferrous hydroxides which coat the molybdate particles. A fraction of the ferrous iron is dissolved by the ammonia solution in the form of an ammoniate complex:

$$Fe(OH)_2 + 6NH_4OH \rightarrow [Fe(NH_3)_6](OH)_2 + 6H_2O \quad (8)$$

Depending upon the composition of the calcines, the degree of extraction of molybdenum into the ammoniacal solutions ranges from 80 to 95 percent. The amount of residue, (i.e., the weight of the residues with respect to the weight of the initial calcines) ranges from 10 to 30 percent, and the molybdenum concentration in the residue ranges from about 3 percent to about 12 percent. As a rule a second extraction of the molybdenum from the residue is required.

Three or four successive processing leaching stages may be used in order to provide a higher degree of leaching molybdenum from the calcine if desired. The weak solutions from subsequent leachings may be returned to the initial leaching stage. The slurries are filtered in any convenient means to separate the insolubles from the solutions. Residues may be rinsed with hot water and the wash waters may be recycled to an earlier leaching stage. The ammonia solution from the leaching may contain from about 50 to about 150 g. molybdenum per liter.

The ammoniacal solutions are contaminated with copper, iron, occasionally zinc and nickel, alkali metal and sulphate ions. In one of the prior art processes the copper is removed as a sulphide by the addition of a sulphur containing compound. In this process the sulphur is added to the solution by any means such as the addition of ammonium sulphide, hydrogen sulphide, sulphur dioxide or elemental sulphur. One of the disadvantages of adding sulphur or sulphur containing compounds to the leach solution is to add contaminants to the leach solution that are not completely removed in the later processing. It is also disadvantageous because the leach solution, after the addition of the sulphur or sulfur containing compound to precipitate the relatively insoluble copper and iron sulphides, always contains some copper bound up in the solution as a stable complex.

It is also a disadvantage of the prior art process that the sulphur added must be closely controlled since an excess of the sulphur in solution leads to the formation of thiomolybdates which contaminate the ultimate product:

$$(NH_4)_2MoO_4 + 4NH_4HS \rightleftharpoons (NH_4)_2MoS_4 + 4NH_4OH \quad (9)$$

The thiomolybdate formed will redissolve the precipitated copper sulfide thus making the satisfactory removal of copper even more difficult on a commercial scale.

If the metal impurities, particularly copper, are precipitated as metal sulphides the solution after filtration will generally contain unsaturated sulfur compounds such as sulfur dioxide, thionates, and polythionates. These compounds under certain conditions can further contaminate the product and should be removed from the solution prior to the recovery of the molybdenum. Thus it is necessary to treat the solution with oxygen or an oxygen-bearing gas until the sulfur compounds are completely oxidized and thereby removed from the solution.

It is an object of this invention to provide a hydrometallurgical process method for recovering molybdenum and copper from roasted molybdenite concentrates. Another object of this invention is to provide a method by which copper can be efficiently and inexpensively separated from an ammoniacal leach solution so as to allow recovery of the molybdenum by evaporation. Yet another object of this invention is to provide a process for recovery of copper and molybdenum from ammoniacal leach solutions which has a very low reagent consumption. A very specific object of this invention is to provide a process to yield a molybdenum product that is very low in copper and other detrimental impurities.

The effectiveness of the process described herein revolves around the discovery that the contaminate copper may be substantially removed without the necessity of adding reagents to precipitate the copper. This may be accomplished by (1) partial evaporation of the leach solution followed by dilution back to about its original volume, (2) steam stripping of the leach solution until precipitation of the copper complex is complete, and (3) evaporation of the leach solution under reduced pressure.

The preferred embodiments, the steam stripping and evaporation-dilution, are shown in the flow diagram of FIG. 1.

In the evaporation-dilution technique the leach solution is pumped into a heating vessel and heated to boiling. The ammonia-water vapor mixture leaving the vessel is recycled to the ammonia leaching stage. As the evaporation proceeds the copper-molybdenum-ammonium complex is formed. The evaporation is continued until from about 25 to 75 percent by volume of the original leach solution has been evaporated. The remaining evaporated leach solution is then diluted with water to about its original volume and the copper-molybdenum-ammonium complex is precipitated out of the solution. The precipitate is removed from the solution and may be treated by any of the methods shown in FIG. 2 to recover the metal values therefrom. The solution now containing from about 50 to about 150 g. molybdenum per liter is evaporated to dryness, dried and calcined to produce high quality molybdenum trioxide having a low copper content.

The precipitate $Cu(NH_3)MoO_4 \cdot nH_2O$ is also removed from the leach solution by steam stripping. The leach solution from the solids-liquid separation stage is fed to the stripping vessel. The vessel is equipped for external heating if that is required. Steam or super heated steam is bubbled through the leach solution. Heat is supplied to maintain the leach solution at its boiling point by using external heating or superheated steam. The volume of the leach solution is maintained essentially constant by controlling the external heat applied to the vessel and/or the amount of steam bubbled through the leach solution. Steam is bubbled through the leach solution until substantially all the copper has precipitated as $Cu(NH_3)MoO_4 \cdot nH_2O$. This can be determined by sampling the leach solution and analyzing for the copper content. Copper content in the stripped leach solution containing about 100 g. molybdenum per liter should be about 0.2 g./l. or less in order to give a molybdenum trioxide product containing less than about 0.15 percent copper. The precipitate is removed from the stripped leach solution by filtration or other method and treated to recover the copper and molybdenum values therefrom. The stripped leach solution is then evaporated to dryness, dried and calcined to yield the molybdenum trioxide product.

In the third method of removing the contaminant copper the leach solution is evaporated under a reduced pressure until about 25 percent to about 50 percent by volume of the leach solution is evaporated. The precipitate is removed from the leach solution and the precipitate and leach solution are treated as discussed above to recover the molybdenum and copper values.

The following specific examples are illustrative but not limitative of my invention. All variations which do not depart from the basic concept of the invention disclosed are intended to come within the scope of the appended claims.

EXAMPLE 1

This example shows how the evaporation-dilution technique was discovered as a means of precipitating copper from an ammoniacal leach solution.

A molybdenum concentrate weighing 100 g. was roasted at 550° C. for 2 hours. The pH of 300 millimeters of an ammoniacal leach solution at 60° C. was adjusted to 8.5 with ammonia gas and was added to the roasted concentrate. The concentrate was kept in suspension using magnetic stirring. Upon the mixing of the leach solution and the roasted concentrate the pH dropped rapidly to about 6.0. Ammonia gas was then added to the leach solution-suspension to bring the pH back to 8.5 and this pH was maintained for the entire leaching time of about 30 minutes. The suspension was filtered and the residue was washed with ammonium hydroxide (pH 8.5). The filtrate was collected (265 ml.) and contained 105.8 g./l. molybdenum and 3.22 g./l. Cu. The residue (41.8 g.) contained 4.76% Mo, and 0.285% Cu. The pH of the filtrate at room temperature was 8.9. In an attempt to cause precipitation carbon dioxide was bubbled through 100 ml. of the filtrate at room temperature for about 50 minutes. The pH of the filtrate dropped slowly to 7.2 but no precipitation could be observed. Seven grams of molybdenum trioxide was added to the solution and the solution was heated to boiling. Most of the molybdenum trioxide dissolved. No satisfactory precipitation of copper was obtained. The remainder of the leach solution was used for test tube experiments. It was found that partial evaporation of the solution, followed by dilution back to the original volume gave good precipitation of a complex identified as $Cu(NH_3)MoO_4 \cdot nH_2O$.

This example also illustrates that pH control alone without dilution of the partially evaporated leach solution will not cause the desired precipitation of the copper-molybdenum-ammonium complex.

EXAMPLE 2

Following the general procedure of Example 1, 89.2 g. of roasted concentrate was leached with 300 ml. of ammonium hydroxide at pH of 8.5. The suspension was filtered and the residue washed with ammonium hydroxide (pH 8.5). The volume of collected filtrate was 278 ml. and had an analysis of 98 g. Mo/l. and 3.02 g. Cu/l. The wash solution, 268 ml., contained 11.98 g. Mo/l. and 0.117 g. Cu/l. The residue weighed 43.8 gms. and contained 6.00 percent molybdenum and 0.701% Cu.

200 ml. of the filtrate was evaporated to 135 ml., i.e., 32.5 percent evaporation. The volume was adjusted to 200 ml. by the addition of water and the evaporation continued. When the solution was evaporated to 100 ml. the solution was allowed to cool, and the precipitate (2.5 g.) copper-ammonium-molybdenum complex, $Cu(NH_3)MoO_4 \cdot nH_2O$, was filtered off. The remaining filtrate was evaporated to dryness and the residue calcined at 600° C. for 1 hour with the recovery of 22 g. of molybdenum trioxide.

EXAMPLE 3

Following the general procedure, 89.2 g. of roasted concentrate was leached with 500 ml. of ammonium hydroxide at a pH of 10. 473 ml. of filtrate containing 63.90 g./l. molybdenum and 1.94 g./l. Cu was collected. The residue was washed with 250 ml. of ammonium hydroxide and the wash solution contained 5.55 g./l. Mo and 0.083 g./l. Cu. The residue weighed 43.0 g. and contained 3.32% Mo and 0.716% Cu. 200 ml. of the filtrate was evaporated to 100 ml., i.e., 50 percent evaporation. The filtrate volume was adjusted by the addition of water to 200 ml. and the filtrate heated to boiling and then allowed to cool to room temperature. The precipitated copper-molybdenum complex weighed 1.5 g. when it was filtered from the solution. After removing the copper precipitant the filtrate was evaporated to dryness and the residue calcined at 600° C. for 1 hour with recovery of 15 g. of molybdenum trioxide product.

EXAMPLE 4

Roasted concentrate weighing 133.8 g. was leached with 300 ml. of ammonium hydroxide having a pH of 10. During the leaching the pH of the solution was maintained as close as possible to 8.5 by addition of ammonia gas to the leach solution. The leach time was 30 minutes. The filtrate from the leach solution, 290 ml., was collected and contained 147.00 g./l. Mo and 4.63 g./l. Cu. The residue was washed with ammonium hydroxide (250 ml.) and the wash solution contained 18.72 g./l. Mo and 0.402 g./l. Cu. The residue weighed 64 gms. and contained 4.77% Mo and 0.456% Cu.

200 ml. of the filtrate was evaporated to 115 ml., i.e., 42.5 percent evaporation, and diluted with water back to the original volume. The filtrate was heated to boiling, cooled and then filtered to recover 4.2 g. of copper-ammonium molybdenum complex precipitate. The copper-ammonium-molybdenum complex analyzed 42.62% Mo and 17.38% Cu. The filtrate was then evaporated to dryness and the residue calcined at 600° C. for 1 hour. The molybdenum trioxide product analyzed 67.88% Mo and 0.20% Cu.

EXAMPLE 5

Roasted concentrate weighing 89.2 g. was leached with 300 ml. of ammonium hydroxide having an initial pH of 10. During the leaching the pH was maintained about 8.5 by the addition of ammonia. 322 ml. of filtrate was collected and contained 91.83 g./l. Mo and 2.73 g./l. Cu. The residue was washed and the wash solution, 250 ml., analyzed 8.71 g./l. Mo and 0.160 g./l. Cu. The 42.3 g. of residue analyzed 4.01 percent molybdenum and 0.813 percent copper.

a. 100 ml. of the filtrate was evaporated to 70 ml., i.e., 30 percent evaporation. 50 ml. of water was then added to the filtrate to dilute it. 1.5 g. $MoO_3$ was added and the solution heated to boiling and filtered after cooling. The filtrate was evaporated to dryness and the residue calcined for 1 hour at 600°. The molybdenum trioxide product analyzed 67.23 percent molybdenum and 0.086% Cu.

b. A second 100 ml. portion of the filtrate was evaporated to 35 ml. i.e., 65 percent evaporation. To dilute the filtrate, 50 ml. of water was added to give a volume of 85 ml. The filtrate was heated to boiling, cooled and then filtered. The filtrate was evaporated to dryness and the residue calcined for 1 hour at 600° C. The molybdenum trioxide product analyzed 68.02% Mo and 0.089% Cu.

EXAMPLE 6

Roasted molybdenum concentrate, 89.2 g., was leached with 300 ml. of ammonium hydroxide with a pH at the start of the leaching of 10. Ammonia was added during the 60 minute leach time to control the pH in the range of 7.5 to 8.0. After 60 minutes 294 ml. of filtrate was collected and contained 99.0 g./l. Mo and 2.17 g./l. Cu. The residue was 42.5 g. and contained 5.03% Mo and 0.626% Cu.

200 ml. of the filtrate was evaporated to 115 ml., i.e., 42.5 percent evaporation. The solution was then diluted to 200 ml. and the pH after dilution was 6.8. The copper-ammoniummolybdenum complex was filtered off and the remaining filtrate evaporated to dryness. The residue after evaporation was calcined at 600° C. for 1 hour and yielded a molybdenum trioxide product containing 67.2% Mo and 0.127% Cu.

EXAMPLE 7 a. 534.6 g. of molybdenum concentrate was roasted at 600° C. for 2 hours. 322 ml. concentrated ammonia and 878 ml. of water, i.e., 1,200 ml. total volume containing 83.7 g. ammonia was used as the leach solution. The roasted concentrate was leached for 60 minutes. The suspension was filtered and 1,000 ml. filtrate was collected. The residue was washed with 200 ml. of water and 150 ml. of the wash solution was collected and added to the filtrate bringing the total volume of the filtrate to 1,150 ml. The leach solution was filtered through a millipore filter. 500 ml. of the filtrate was evaporated to 175 ml. i.e., 65 percent evaporation. Three hundred ml. of wash solution was then added to the evaporated filtrate at boiling. The precipitated copper-ammonium-molybdate was filtered off and weighed 12.5 g. The precipitate analyzed 42.4 percent molybdenum and 15.2 percent copper.

b. Another 500 ml. portion of the filtrate was evaporated to 200 ml., i.e., 60 percent evaporation. 300 ml. of wash solution was added to the filtrate and heated to boiling. Copper-ammonium-molybdate was filtered off and weighed 11.5 g.

c. A portion of the nearly copper free solution from (a) above was passed through a 10 cm. long ion exchange column containing Amberlite CG–50(H)AR resin in a $NH_4^+$ form. The effluent was evaporated and the residue calcined to molybdenum trioxide. The molybdenum trioxide was submitted for spectrographic analysis and contained 0.0004 percent copper.

d. Another 200 ml. portion of the filtrate was passed through a 20 cm. long ion exchange column containing Amberlite CG–50(H)AR resin in $NH_4^+$ form. The effluent from the column was evaporated to dryness and the residue was calcined at 600° C. for 1 hour to form $MoO_3$. The molybdenum trioxide product weighed 28.6 g. and contained 0.0004 percent copper.

EXAMPLE 8

Roasted molybdenum concentrate, 134 g., was leached with a solution containing 81 ml. of concentrated ammonia and 227 ml. of water for 60 minutes. The suspension was filtered and the residue weighed 68.5 g. and contained 7.55% Mo and 0.325% Cu. 265 ml. of filtrate was collected and contained 143.70 g. Mo/l. and 4.42 g. Cu/l. 500 ml. of wash solution contained 13.48 g. Mo/l. and 0.23 g. Cu/l. 200 ml. of the filtrate was evaporated to a 150 ml., i.e., 25 percent evaporation under a vacuum to precipitate the copper-molybdenum complex. The precipitate, 5.8 g., contained 44.0% Mo and 12.39% Cu. The depleted filtrate was evaporated to dryness and the residue calcined at 600° for 1 hour. The molybdenum trioxide product weighed 22.25 g. and contained 66.85% Mo and 0.271% Cu.

EXAMPLE 9

This example demonstrates the use of steam stripping in removing copper from an ammoniacal leach solution containing copper and molybdenum.

A leach solution containing 156.2 g. Mo/l. and 4.62 g. Cu/l. was prepared by leaching a roasted low-grade molybdenum concentrate with ammonium hydroxide at 60° C. for 1 hour. The final pH of the leach leach solution was 8.5

200 ml. of the leach solution was transferred to a vessel and heated. When the boiling temperature was reached steam was bubbled through the leach solution. The volume of the leach solution was maintained essentially constant by controlling the external heat supplied to the vessel.

After about 27 minutes of steam bubbling the pH of the leach solution had dropped to about 7.4 and precipitation of $Cu(NH_2)MoO_{4c} \cdot nH_2O$ had started.

Steam bubbling was discontinued after 180 minutes and the leach solution was filtered. The pH of the purified leach solution was 6.35 and the copper content of the leach solution was 0.094 g./l. Evaporation of the purified leach solution to dryness and subsequent calcination of the residue yielded a $MoO_3$ product containing 0.05% Cu by weight.

Table I below is a compilation of the data from Examples 1 through 9 and further Examples 10 through 13.

TABLE I

| Example | Leach Conditions | | | | Composition of Leach Solution | | | Composition of Residue | | Percentage Extraction | |
|---|---|---|---|---|---|---|---|---|---|---|---|
| | pH | T° C. | Time | S/L ratio | Mo g./l. | Cu g./l. | pH | Mo, percent | Cu, percent | Mo | Cu |
| 1 | 6.0–8.6 | 60–80 | 30 | 1/3.4 | 105.8 | 3.22 | 8.9 | 4.76 | 0.285 | 93.9 | 88.4 |
| 2 | 6.2–9.5 | 60–70 | 30 | 1/3.4 | 98.0 | 3.02 | 9.18 | 6.00 | 0.711 | 92.1 | 73.9 |
| 3 | 8.5–9.5 | 60–70 | 30 | 1/5.6 | 63.9 | 1.94 | 9.53 | 3.32 | 0.716 | 95.8 | 75.3 |
| 4 | 8.5–9.5 | 60–70 | 30 | 1/2.2 | 147.0 | 4.63 | 9.20 | 4.77 | 0.456 | 93.9 | 83.2 |
| 5a | 8.5–9.5 | 60–70 | 30 | 1/3.4 | 91.8 | 2.73 | 9.18 | 4.01 | 0.813 | 94.7 | 72.8 |
| 5b | 8.5–9.5 | 60–70 | 60 | 1/3.4 | 91.8 | 2.73 | 9.18 | 4.01 | 0.813 | 94.7 | 72.8 |
| 6 | 7.5–8.0 | 58–72 | 60 | 1/3.3 | 99.0 | 2.17 | 8.28 | 5.03 | 0.626 | | |
| 7a | 8.0–9.5 | 42–60 | 60 | 1/1.9 | | | 8.6 | | | | |
| 7b | 8.0–9.5 | 42–60 | 60 | 1/1.9 | | | 8.6 | | | | |
| 7c | 8.0–9.5 | 42–60 | 60 | 1/1.9 | | | 8.6 | | | | |
| 7d | 8.0–9.5 | 42–60 | 60 | 1/1.9 | | | 8.6 | | | | |
| 8 | | 60 | 60 | 1/4.4 | 143.7 | 4.42 | | 7.55 | 0.325 | | |
| 9 | | 60 | 60 | | 156.2 | 4.62 | 8.5 | | | | |
| 10 | 8.6–10 | 60–68 | 45 | 1/3.4 | 107.2 | 3.30 | 8.7 | 5.03 | 0.496 | | |
| 11a | 8.5–10 | 58–72 | 45 | 1/2.2 | 152.2 | 4.42 | 8.5 | 3.90 | 0.541 | | |
| 11b | 8.5–10 | 58–72 | 45 | 1/2.2 | 152.2 | 4.42 | 8.5 | 3.90 | 0.541 | | |
| 12a | 8.5–10 | 60–72 | 45 | | 144.4 | | 8.5 | 7.03 | 0.277 | | |
| 12b | 8.5–10 | 60–72 | 45 | | 144.4 | | 8.5 | 7.03 | 0.277 | | |
| 12c | 8.5–10 | 60–72 | 45 | | 144.4 | | 6.5 | 7.03 | 0.277 | | |
| 13 | | 60 | 60 | | 134.0 | 1.7 | | 12.12 | 0.450 | 81.6 | 59.9 |

| Example | Percent evaporation by volume | Amount of Cu-Mo precipitate per liter of leach solution, grams | Composition of Cu precipitate Mo, percent | Composition of Cu precipitate Cu, percent | Mo-concentration before evaporation, g./l. | Chem. analysis of $MoO_3$ product Mo, percent | Chem. analysis of $MoO_3$ product Cu, percent | Notes |
|---|---|---|---|---|---|---|---|---|
| 1 | | | | | | | | |
| 2 | 32.5 | 12.5 | 41.81 | 19.79 | 92.8 | 66.99 | 0.12 | |
| 3 | 50.0 | 7.5 | 41.17 | 20.57 | 60.8 | 67.04 | 0.063 | |
| 4 | 42.5 | 21.0 | 42.62 | 17.38 | 138.0 | 67.88 | 0.20 | |
| 5a | 30.0 | | | | | 67.23 | 0.086 | $Cu(NH_3)MoO_4 \cdot nH_2O$ not collected. |
| 5b | 65.0 | | | | | 68.02 | 0.089 | Do. |
| 6 | 42.5 | 10.5 | 42.6 | 18.2 | | 67.2 | 0.127 | |
| 7a | 65.0 | 25.0 | 42.4 | 15.2 | | | | |
| 7b | 60.0 | 23.0 | | | | | | |
| 7c | | | | | | | | |
| 7d | | | | | | | .0004 | Ion exchange. |
| 8 | 25.0 | | 44.0 | 12.39 | | | .0004 | Do. |
| 9 | | | | | | 66.85 | 0.271 | Vacuum evaporation. |
| | | | | | | | 0.05 | Steam stripping, after precipitation leach solution contained 0.094 gm. Cu./l. |

| Example | Percent evaporation by volume | Amount of Cu-Mo precipitate per liter of leach solution, grams | Composition of Cu precipitate | | Mo-concentration before evaporation, g./l. | Chem. analysis of MoO₃ product | | Notes |
|---|---|---|---|---|---|---|---|---|
| | | | Mo, percent | Cu, percent | | Mo, percent | Cu, percent | |
| 10 | 55.0 | | 42.55 | 18.85 | | 67.90 | 0.124 | |
| 11a | 57.5 | | 42.6 | 16.9 | | 68.2 | 0.138 | |
| 11b | 52.5 | | 43.8 | 16.7 | | 67.9 | 0.222 | CO₂ bubbling. |
| 12a | 50.0 | | 46.08 | 5.16 | | 64.85 | 0.195 | |
| 12b | 50.0 | | 53.05 | 2.74 | | | | CO₂ bubble through cold leach solution. |
| 12c | | | 40.50 | 15.75 | | 65.36 | 0.109 | 4.163g. conc. H₂SO₄ added before evaporation. |
| 13 | | | | | | | | Cu(NH₃)MoO₄·nH₂O and MoO₃ product not collected. |

Figure 2:
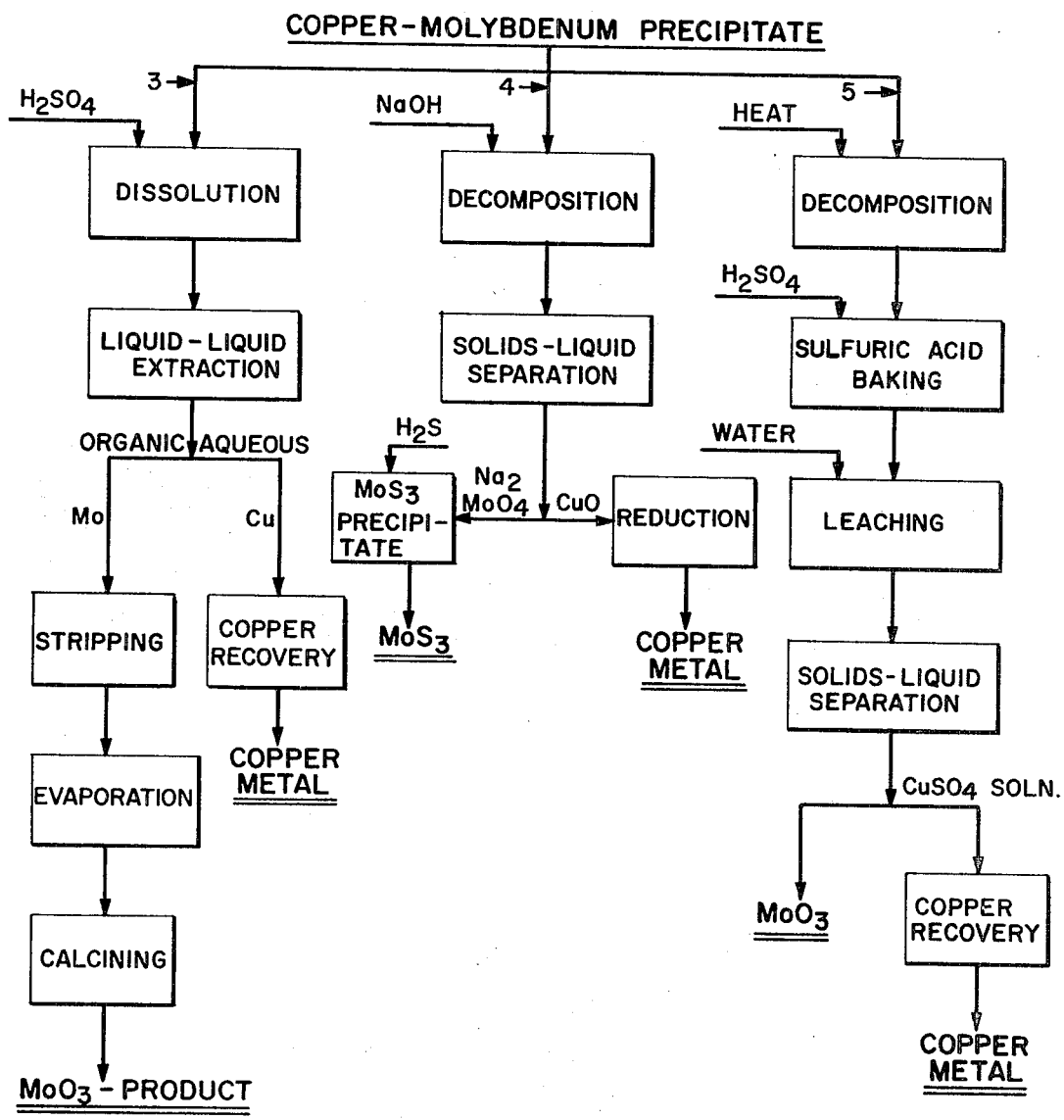
FIG. 2 illustrates three methods for recovering the molybdenum and copper values from the precipitate.

Referring to FIG. 2 it is apparent that there are at least three known methods by which the metal values may be recovered from the Cu(NH₃)MoO₄·nH₂O precipitate. In process stream 3 the precipitated copper-molybdenum-ammonium complex is dissociated with sulfuric acid. An organic-aqueous liquid-liquid extraction is then used to separate the molybdenum from the copper. Conventional recovery techniques are then used to produce molybdenum trioxide and copper metal.

In another method as shown in process stream 4, sodium hydroxide treatment decomposes the Cu(NH₃)MoO₄·nH₂O precipitate into Na₂MoO₄ and CuO. After a solids-liquid separation MoS₃ is recovered by bubbling hydrogen sulfide through the liquid and copper metal is recovered by reduction of copper oxide.

The copper-molybdenum complex decomposes upon heating to yield a mixture of copper and molybdenum oxides as shown in process stream 5 of FIG. 2. Sulfuric acid baking of the copper-molybdenum oxide mixture converts the copper to water soluble copper sulfate leaving behind the molybdenum as MoO₃. Recovery of the copper metal and MoO₃ is then made by leaching, solids-liquid separation and recovery of copper from the copper sulfate solution by conventional methods.

This invention may be embodied in other forms or carried out in other ways without departing from the spirit or the essential characteristics thereof. The embodiments presented above are therefore to be considered as in all respects illustrative and not restrictive, the scope of the invention being indicated by the appended claims, and all changes which come within the meaning and range of equivalency are intended to be embraced therein.

What is claimed is:

1. The method of recovering high purity molybdenum from a copper containing molybdenum ore concentrate comprising the steps of
   a. roasting the molybdenum ore concentrate in the presence of oxygen at a temperature below about 600° C. to oxidize the molybdenum content of the concentrate,
   b. leaching the roasted concentrate with an aqueous ammoniacal solution to obtain substantially complete extraction of the molybdenum from the roasted concentrate and its dissolution in the leach solution, the aqueous ammoniacal solution containing at least 2 moles of ammonia per mole of molybdenum,
   c. separating the insoluble residue from the leach solution,
   d. partially evaporating the leach solution until there is from about 25 to about 75 volume percent reduction of the leach solution,
   e. diluting the partially evaporated leach solution with water to about its original volume thereby precipitating the copper from the leach solution as cupric ammonium molybdate,
   f. separating the precipitated cupric-ammonium molybdate from the leach solution,
   g. evaporating the leach solution to dryness to obtain a molybdenum containing compound, and
   h. calcining the molybdenum containing compound to obtain a high purity molybdenum trioxide product.

2. The process of claim 1 wherein the aqueous ammoniacal solution contains from about 2.5 to about 3.0 moles of ammonia per mole of molybdenum.

3. The process of claim 1 wherein the partial evaporation of the leach solution is continued until there is from about 50 to about 75 volume percent reduction of the leach solution.

4. The method of removing copper and recovering molybdenum trioxide from a leach solution obtained by ammoniacal leaching with an aqueous ammoniacal solution containing at least 2 moles ammonia per mole of molybdenum a copper containing molybdenum concentrate roasted at a temperature below about 600° C. comprising the steps of:
   a. partially evaporating the leach solution to at least 70 percent of its original volume,
   b. diluting the partially evaporated solution with water to about its original volume whereby the copper is precipitated from the leach solution as cupric ammonium molybdate,
   C. separating the precipitated cupric ammonia molybdate from the leach solution,
   d. evaporating the leach solution to dryness to obtain a molybdenum containing compound, and
   e. calcining the molybdenum containing compound to recover molybdenum trioxide.

5. The process of claim 4 wherein the leach solution is evaporated until there is from about 25 to about 75 volume percent reduction of the leach solution.

6. The method of recovering high purity molybdenum from a copper containing molybdenum ore concentrate comprising the steps of
   a. roasting the molybdenum ore concentrate in the presence of oxygen at a temperature below about 600° C. oxidize the molybdenum content of the concentrate,
   b. leaching the roasted concentrate with an aqueous ammoniacal solution to obtain substantially complete extraction of the molybdenum from the roasted concentrate and its dissolution in the leach solution, the aqueous ammoniacal solution containing at least 2 moles of ammonia per mole of molybdenum,
   c. separating the insoluble residue from the leach solution,
   d. bubbling steam through the leach solution until the copper in the leach solution precipitates out as a cupric ammonium molybdate, the steam being bubbled into the leach solution at a rate such that the volume of the leach solution remains essentially constant,
   e. separating the precipitated cupric ammonium molybdate from the leach solution,
   f. evaporating the leach solution to dryness to obtain a molybdenum containing compound, and
   g. calcining the molybdenum containing compound to obtain a high purity molybdenum trioxide product.

7. A method of removing copper and recovering molybdenum trioxide from an ammoniacal solution containing molybdenum obtained by roasting at a temperature below about 600° C. a copper containing molybdenum ore concentrate and leaching the roasted concentrate with an aqueous ammoniacal solution containing at least 2 moles ammonia per mole of molybdenum comprising the steps of bubbling steam into the ammoniacal solution at a rate such that the volume of the ammoniacal solution remains essential constant until the copper precipitates out of the solution as cupric ammonium molybdate, separating the cupric ammonium molybdate from the solution, evaporating the ammoniacal solution to dryness to obtain a molybdenum containing compound and calcining the molybdenum containing compound to recover molybdenum trioxide.

* * * * *